US010452756B2

(12) United States Patent
Dubinko et al.

(10) Patent No.: US 10,452,756 B2
(45) Date of Patent: Oct. 22, 2019

(54) PLATFORM FOR RENDERING CONTENT FOR A REMOTE DEVICE

(75) Inventors: Micah Dubinko, Sunnyvale, CA (US); Zhaowei Charlie Jiang, Palo Alto, CA (US); Nigel Choi, Sunnyvale, CA (US); Chen Li, Sunnyvale, CA (US); Keith Anthony Marlow, Galston (AU); Guang Yang, Los Angeles, CA (US); Olga Volodymyrivna Gavrylyako, Fremont, CA (US); James Liang, Los Angeles, CA (US); Jeff Leung, Mountain View, CA (US); Michael Jeremy Temkin, San Francisco, CA (US); Abdul Rasel Khan, London (GB); Ming Sui, Fremont, CA (US); Hui Guo, Santa Clara, CA (US); Jaekwon Park, San Jose, CA (US); Surendra Sadanand Rajam, Sunnyvale, CA (US); Takayuki Tei, San Jose, CA (US)

(73) Assignee: OATH INC., New York, NY (US)

( * ) Notice: Subject to any disclaimer, the term of this patent is extended or adjusted under 35 U.S.C. 154(b) by 922 days.

(21) Appl. No.: 11/537,593

(22) Filed: Sep. 29, 2006
(Under 37 CFR 1.47)

(65) Prior Publication Data
US 2008/0155396 A1    Jun. 26, 2008

(51) Int. Cl.
*G06F 17/22*    (2006.01)
*G06F 17/21*    (2006.01)
*G06F 16/957*    (2019.01)

(52) U.S. Cl.
CPC ...... *G06F 17/2247* (2013.01); *G06F 16/9577* (2019.01); *G06F 17/217* (2013.01)

(58) Field of Classification Search
CPC .... G06F 17/217; G06F 17/211; G06F 17/212; G06F 17/30905; G06F 17/30761; G06F 17/227; G06F 17/30762
(Continued)

(56) References Cited

U.S. PATENT DOCUMENTS 6,178,430 B1 *  1/2001  Cohen ................. G06F 17/2247
                                               707/E17.006
6,278,992 B1 *  8/2001  Curtis ............... G06F 17/30324
                                               707/711
(Continued)

FOREIGN PATENT DOCUMENTS

EP        0987868       3/2000
JP     2001-195391 A    7/2001
(Continued)

OTHER PUBLICATIONS

Schilit, Bill "Web Interaction Using Very Small Internet Devices" Oct. 2002.*
(Continued)

*Primary Examiner* — Manglesh M Patel
*Assistant Examiner* — Nicholas Hasty
(74) *Attorney, Agent, or Firm* — James J. DeCarlo; Greenberg Traurig, LLP

(57) ABSTRACT

A platform for customized rendering of markup language (ML) documents into a document in a device specific language that is subsequently provided for display by a target remote device. A rendering context for the target remote device and an ML document is received by the platform, which performs processes that can paginate and fully render pages that are subsequently delivered for display by the target remote device. A post-rendering process may also be provided to perform additional processing of media items for the device specific language document. This (Continued)

additional processing may include including links to or embedding media items in pages of the device specific language document. The remote device can be arranged as a client device that provides for wired and/or wireless communication over a network.

19 Claims, 13 Drawing Sheets

(58) Field of Classification Search
USPC .......... 715/251, 239, 246, 205; 707/E17.121
See application file for complete search history.

(56) References Cited

U.S. PATENT DOCUMENTS

| | | | |
|---|---|---|---|
| 6,473,609 B1* | 10/2002 | Schwartz et al. | 455/406 |
| 7,016,963 B1* | 3/2006 | Judd | G06F 17/30905 707/E17.121 |
| 7,072,984 B1* | 7/2006 | Polonsky | G06F 17/30905 707/E17.121 |
| 7,162,221 B2* | 1/2007 | Spitz et al. | 455/406 |
| 7,356,843 B1* | 4/2008 | Kingsford | G06F 21/552 707/999.2 |
| 7,900,137 B2* | 3/2011 | Ivarsoy et al. | 715/238 |
| 2002/0019812 A1 | 2/2002 | Board et al. | |
| 2002/0156813 A1* | 10/2002 | Gardner | 707/513 |
| 2003/0023755 A1* | 1/2003 | Harris et al. | 709/246 |
| 2003/0236917 A1* | 12/2003 | Gibbs | G06F 17/30905 709/248 |
| 2004/0019628 A1 | 1/2004 | Puri et al. | |
| 2004/0110490 A1* | 6/2004 | Steele et al. | 455/412.1 |
| 2004/0148571 A1* | 7/2004 | Lue | G06F 17/30905 715/239 |
| 2005/0132286 A1* | 6/2005 | Rohrabaugh | G06F 9/4443 715/239 |
| 2006/0161646 A1 | 7/2006 | Chene et al. | |
| 2006/0200761 A1* | 9/2006 | Judd et al. | 715/517 |
| 2007/0113172 A1* | 5/2007 | Behrens et al. | 715/513 |
| 2007/0113179 A1 | 5/2007 | Gibbs et al. | |
| 2007/0288853 A1* | 12/2007 | Neil | 715/760 |
| 2008/0040659 A1 | 2/2008 | Doyle | |

FOREIGN PATENT DOCUMENTS

| | | | |
|---|---|---|---|
| JP | 2003-271508 A | 9/2003 | |
| JP | 2005-018390 A | 1/2005 | |
| JP | 2006-031476 A | 2/2006 | |
| JP | 2006-243829 A | 9/2006 | |
| WO | 0039666 A1 | 7/2000 | |
| WO | WO 00/73981 A2 * | 12/2000 | G06F 17/30 |
| WO | 0186462 A1 | 11/2001 | |
| WO | WO 02/50719 A2 * | 7/2002 | G06F 17/30 |
| WO | 2005/003998 | 12/2003 | |
| WO | 2005076153 A1 | 8/2005 | |

OTHER PUBLICATIONS

"Volantis: Content Delivery Platform," Volantis Systems, 9 pages, http://www.volantis.com/content-delivery-platform (accessed Aug. 29, 2008).
"Captcha," (Mar. 12, 2006). In *Wikipedia, The Free Encyclopedia*, 07:41 UTC. Wilkimedia Foundation, Inc. accessed Feb. 26, 2007, http://en,wikipedia.org/w/index.php?title=Captcha&oldid=43407448.
"Turing test," (Feb. 20, 2007). In *Wikipedia, The Free Encyclopedia*. 12:23 UTC. Wikimedia Foundation, Inc. (accessed Feb. 26, 2007). http://en.wikipedia.org/w/index.php?title=Turing_test&oldid=109540488.
Passani, L., "Welcome to the WURFL, the Wireless Universal Resource File," (accessed Oct. 24, 2007) http://wurfl.sourceforge.net.
Passani, L., "What's the WURFL?" (accessed Oct. 24, 2007)http://wurfl.sourceforge.net.
Sybase Performance and Tuning: Locking, Adaptive Server Enterprise 12.5.1, Chapter 7 How Indexes Work, Aug. 2003, p. 125-126.
Official Communication for Korean Patent Application No. 10-2009-7008781, dated Jan. 13, 2011, 2 pages.
Official Communication for Japanese Patent Application No. 2009-530488, dated Apr. 22, 2011, 5 pages.
http://en.wikipedia.org/wiki/HTML, HTML, Wikipedia, last modified Jul. 7, 2010, 17 pages.
Simon, R. et al., "Tool-Supported Single Authoring for Device Independence and Multimodality," MobileHCI '05, Sep. 19-22, 2005, Salzburg, Austria, pp. 91-98.
Official Communication for Chinese Patent Application No. 200780036416.7 dated Jul. 6, 2011.
Official Communication for U.S. Appl. No. 11/933,082 dated Jul. 12, 2011.
International Search Report and Written Opinion for International Application No. PCT/US2007/072796 dated Dec. 3, 2007.
International Preliminary Report on Patentability for International Patent Application No. PCT/US2007/072796 dated Apr. 9, 2009.
European Search Report for European Patent Application No. 07799303.8-2201 dated Dec. 9, 2009.
Official Communication for Chinese Patent Application No. 200780036416.7 dated May 21, 2010.
Official Communication for Japanese Patent Application No. 2009-530488 dated Feb. 6, 2012.
Official Communication in Chinese Patent Application No. 2007-80036416.7 dated Sep. 13, 2012.
Official Communication for Chinese Patent Application No. 2007800364167 dated Mar. 7, 2012.

* cited by examiner

PLATFORM FOR RENDERING CONTENT FOR A REMOTE DEVICE

FIELD OF THE INVENTION

The invention is generally directed to providing content over a network, and more particularly to enabling content from disparate sources to be rendered for use with a particular remotely located device

BACKGROUND OF THE INVENTION

Recent surveys have identified over 10,000 different models of mobile devices, such as mobile telephones, in operation world wide. To meet the growing popularity of mobile devices, ten or more new models are being introduced into the marketplace each week. Also, there are hundreds of different carriers around the world that enable a wide variety of wireless services and communication links with different capabilities for providing content to mobile devices and other remotely located devices. Consequently, the context for providing and rendering content for use with a target remote device and/or a carrier can vary widely.

For example, there is not a standard size or color palette for display screens. Consequently, content rendered for use with a color display of one size may or may not be accurately displayable, if at all, by a monochrome display of a different size. Also, the capacity and reliability of different communication links provided by carriers to their individual customers can significantly impact the accurate and timely rendering of content for display on a remote device. Additionally, the general operation and known bugs in client applications such as browsers can widely differ. Furthermore, a developer may create content in one or more different languages that can have parameters that must be considered for accurate rendering of the content for display on a target remote device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF THE EMBODIMENTS

Figure 1:
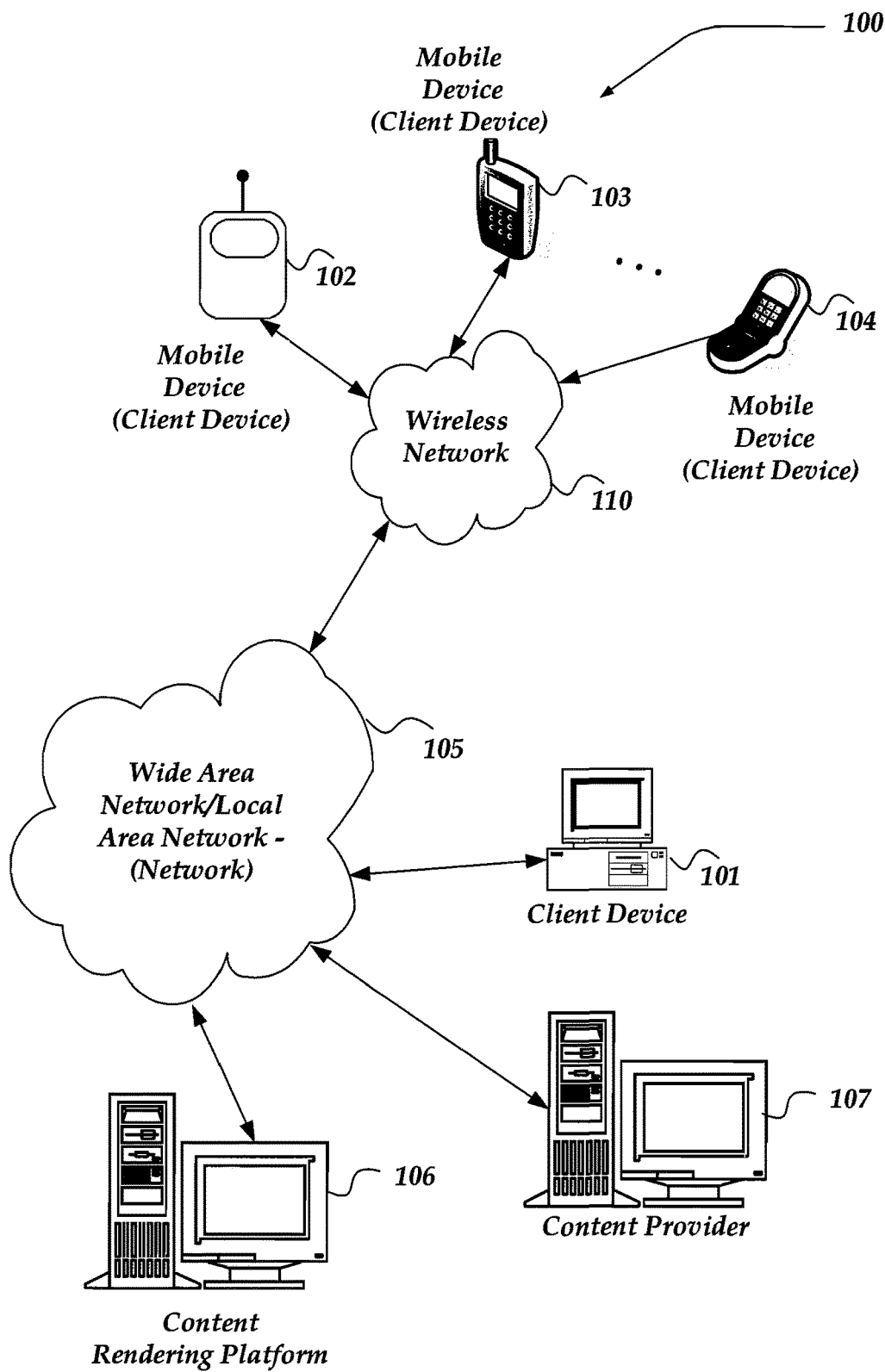
FIG. 1 illustrates a diagram of one embodiment of an exemplary system in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" an item, such as a request, response, or other message, from a device or component includes receiving the message indirectly, such as when forwarded by one or more other devices or components. Similarly, "sending" an item to a device or component includes sending the item indirectly, such as when forwarded by one or more other devices or components.

As used herein, the term "mobile identification number" (MIN) refers to a number that uniquely identifies a mobile device within a mobile carrier's network. A cellular telephone's phone number may be used as a MIN.

As used herein, the term "mobile client application" refers to an application that runs on a mobile device. A mobile client application may be written in one or more of a variety of languages, such as 'C', 'C++', 'J2ME', "Brew", Java, and the like. Browsers, email clients, text messaging clients, calendars, and games are examples of mobile client applications.

As used herein, the term "network application" refers to a computer-based application that communicates, directly or indirectly, with at least one other component across a network. Web sites, email servers, messaging servers, and game servers are examples of network applications.

As used herein, the term "uniform resource identifier" (URI) refers to an identifier used to identify an abstract or physical resource. The term URI includes a uniform resource locator (URL) and a uniform resource name (URN). RFC 3986 describes a syntax for a URI. As used herein, the term URI is not limited to this syntax, and may include other syntaxes.

Briefly stated, the invention is directed to a platform for customized rendering of markup language pages provided over a network for subsequent display by a remote device. A rendering context for the target remote device and a markup language (ML) document is received by the platform, which enables processes that can paginate and fully render the pages into a device specific language. The device specific language document is subsequently delivered for display by the target remote device. A post-rendering process may also be provided to perform additional processing of media items for the document in the device specific language. This additional processing may include retrieving and embedding images in pages of the device specific document. For example, if a page is rendered in device specific language and includes a link to an image, the post-processing component may retrieve the image and embed it within the page as base 64 encoded data, or another format. This post processing may also provide for rewriting a link to a media item in a device specific language document, e.g., a link to an image file that is stored at a particular location in a device specific format such as GIF or JPEG that is suitable for display by the target remote device. The platform is markup language agnostic and can employ templates in the custom rendering process. Also, in at least one embodiment, the remote device is arranged as a client device that provides for wired and/or wireless communication over a network.

The markup language document can be provided in virtually any standard or non-standard format, including, but not limited to, Standard Generalized Markup Language (SMGL), HyperText Markup Language (HTML), eXtensible Markup Language (XML), and the like. Additionally, the device specific language for a remote device can include, but is not limited to, Handheld Device Markup Language (HDML), Wireless Markup Language (WML), WMLScript, Compact HTML (cHTML), eXtensible HTML (XHTML), and the like.

In at least one embodiment, the ML document may be provided to the platform in a mobile Mark Up Language (MML) that includes modules that are independent of the target remote device. In this case, the platform walks the MML document to identify MML modules and instantiates a tree of classes based on the included modules. A resource, such as a platform, can subsequently resolve the tree so that a fully rendered MML document can be provided for subsequent display by the target remote device.

The rendering context can be arranged as a data structure that contains the various parameters and data that are employed by the platform to optimize the rendering of each page in the ML document for display with a particular remote device. The rendering context is generally provided to the platform by a separate application, platform, or process that can be managed by a content provider, carrier, and/or another $3^{rd}$ party service. The rendering context for a remote device can include, but is not limited to, screen size, color capabilities, type of markup language, browser application, known bugs in a software or hardware version of the mobile device or network gateway, or the like. Also, the platform can store configuration data related to attributes of a variety of remote devices and network carriers and methods of storing and retrieving the configuration data. In at least one embodiment, the storage and retrieval of data and/or parameters associated with a rendering context for a target remote device is provided in an HTTP cookie.

The rendering of the ML document into a device specific language document can include a plurality of different processes, including: (1) determining if location information regarding the target remote device can be provided in response to a request; (2) minifying cascading style sheets (CSS) by removing extraneous sheets; (3) fontifying cascading style sheets by stripping them out and rewriting as ML code; (4) shrinking the ML document to remove any ML code that is extraneous to the target remote device; (5) specifying one or more attributes of each media item to be embedded or linked in a page; (6) employing an estimate of each page size to repaginate the ML document pages to a size that is no more than the effective display screen size of the target remote device; (7) tailoring/removing ML code in a page that is estimated to be rendered as larger than the effective display screen size of the target remote device; and/or (8) rewriting URLs in a page to include locations of content and/or session identification information.

The rendering of the pages of the ML document for the target remote device may further include rewriting links or URIs within the document. For example, if the ML document includes a link to an image in one format, the link may be modified to an alternate image in a second format, if the target remote device is unable to display the first format. A link may also be rewritten to include a parameter, such as a value to identify a continuing session, so that a new request using the link returns the session identifier.

Additionally, to facilitate faster and/or efficient rendering of a Markup Language document by at least one of a plurality of different processes, a temporary Markup Language identification (ML ID) can be added to each unique string in the document's pages that don't already have an existing ML ID. A temporary index can be built for each existing and temporary ML ID, which is then used by the plurality of processes to quickly find and render the corresponding elements (unique strings) in the ML document. Once the rendering is completed into the device specific language, the temporary ML IDs and temporary index can be removed. The use of temporary ML IDs and a temporary index can reduce the likelihood that a particular process has to parse the entire ML document to perform its portion of the rendering of the device specific language document for the target remote device. Also, in at least one embodiment, the temporary ML ID is an XML ID.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, Content Rendering Platform (CRP) 106, mobile devices (client devices) 102-104, client device 101, and content provider 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application for the mobile device is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display content and communicate messages.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ, mobile device manufacturer, model number, display colors, display size, enabled features, and wireless carrier. Such information may be provided in a message, or the like, sent to CRP 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as CRP 106, client device 101, or the like. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, MMS application, and the like.

Mobile devices 102-104 may further be configured to include a client application that enables the end-user to log into an end-user account that may be managed by another computing device, such as Content Provider 107. Such end-user account, for example, may be configured to enable the end-user to receive emails, send/receive IM messages, SMS messages, access selected web pages, participate in a social networking activity, or the like. However, participation in various social networking activities may also be performed without logging into the end-user account. Additionally, mobile devices 102-104 may also communicate with non-mobile client devices, such as client device 101, or the like.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), and $4^{th}$ (3G) generation radio access for cellular systems, WLAN, WiMax, Wireless Router (WR) mesh, and the like. Access technologies such as 2G, 3G, 3G, and future wireless access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), Universal Mobile Telephone System (UMTS), and the like. In essence, wireless network 110 may include virtually any wireless communication mechanism by which information may travel between mobile devices 102-104 and another computing device, network, and the like.

Network 105 is configured to couple CRP 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between CRP 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of CRP 106 is described in more detail below in conjunction with FIG. 3. Briefly, however, CRP 106 may include any computing device capable of connecting to network 105 to enable a platform for language agnostic rendering of markup language templates and pages for subsequent display by a particular remote device, such as mobile devices 102-104 and client device 101. A rendering context for the particular remote device and a markup language document are received by the platform, which processes both to generate a document in a device specific language that is subsequently delivered to, and displayed by, that particular remote device. Devices that may operate as CRP 106 include personal computers desktop computers, multiprocessor systems, microprocessor-based or programmable consumer electronics, network PCs, servers, and the like.

Although FIG. 1 illustrates CRP 106 as a single computing device, the invention is not so limited. For example, one or more functions of CRP 106 may be distributed across one or more distinct computing devices. For example, content rendering and the like, may be performed by a plurality of computing devices, without departing from the scope or spirit of the present invention.

Content provider 107 can also include a variety of services used to provide content to remote devices. Such services include, but are not limited to web services, third-party services, audio services, video services, email services, IM services, SMS services, MMS services, VOIP services, video game services, gaming services, calendaring services, shopping services, photo services, or the like. Devices that may operate as content provider 107 include personal computers desktop computers, multiprocessor systems, microprocessor-based or programmable consumer electronics, network PCs, servers, and the like.

Illustrative Mobile Device

Figure 2:
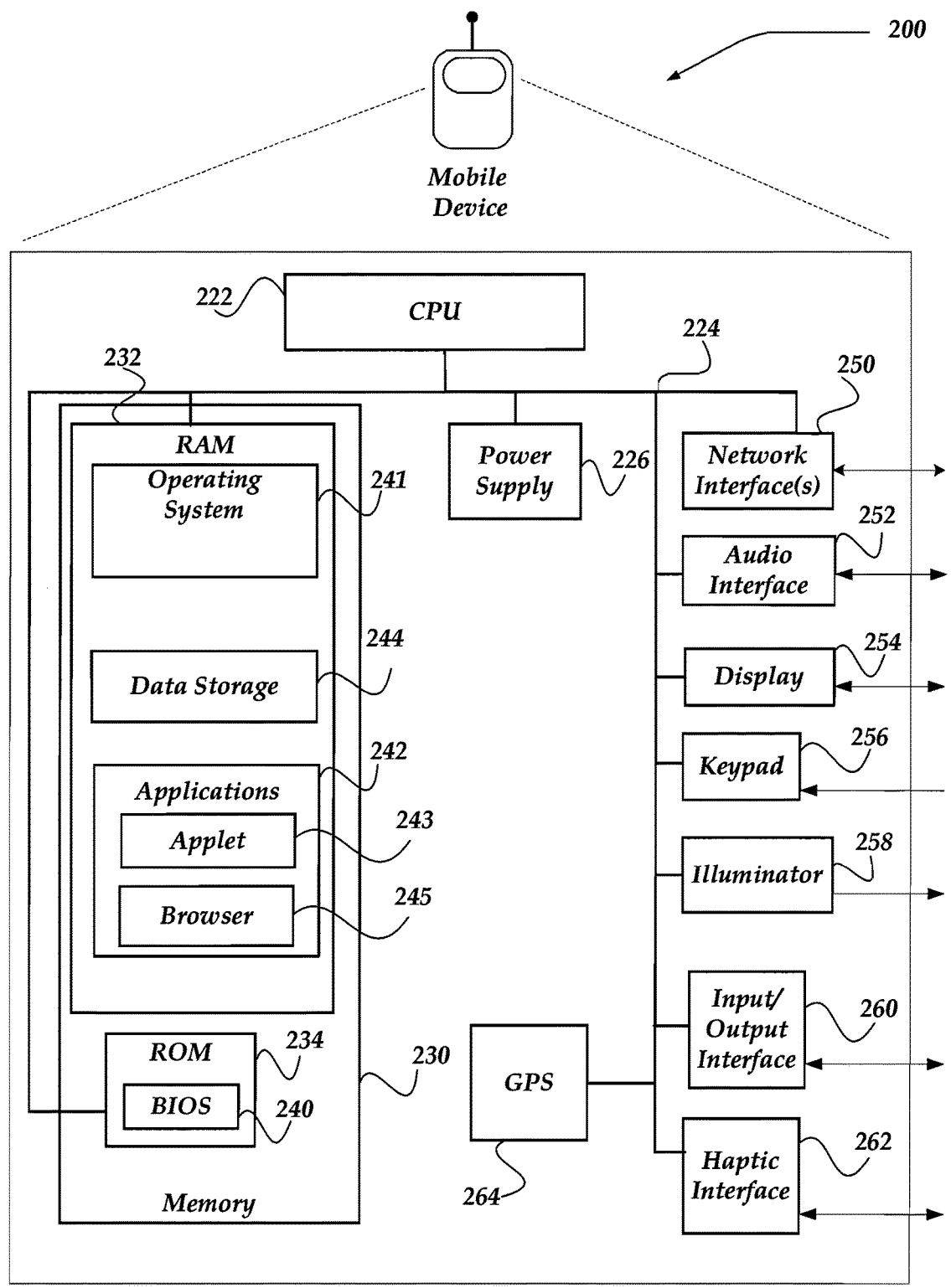
FIG. 2 shows one embodiment of an exemplary mobile device.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), Wide CDMA (CDMA), time division multiple access (TDMA), Universal Mobile Telephone Service (UMTS), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, video games, gaming programs, search programs, shopping cart programs, and so forth. Applications 242 may further include browser 245.

Browser 245 may be configured to receive and enable a display of rendered content provided by CRP 106 from content provider 107. Further, browser 245 enables the user of mobile device 200 to select different actions displayed by the rendered content. In at least one embodiment, browser 245 enables the user to select one or more of a product to purchase, search for content and display the result, call a mobile telephonic device, display and respond to messages, or the like. Various embodiments for rendering the content for display on the mobile device are described in more detail below.

Illustrative Network Device

Figure 3:
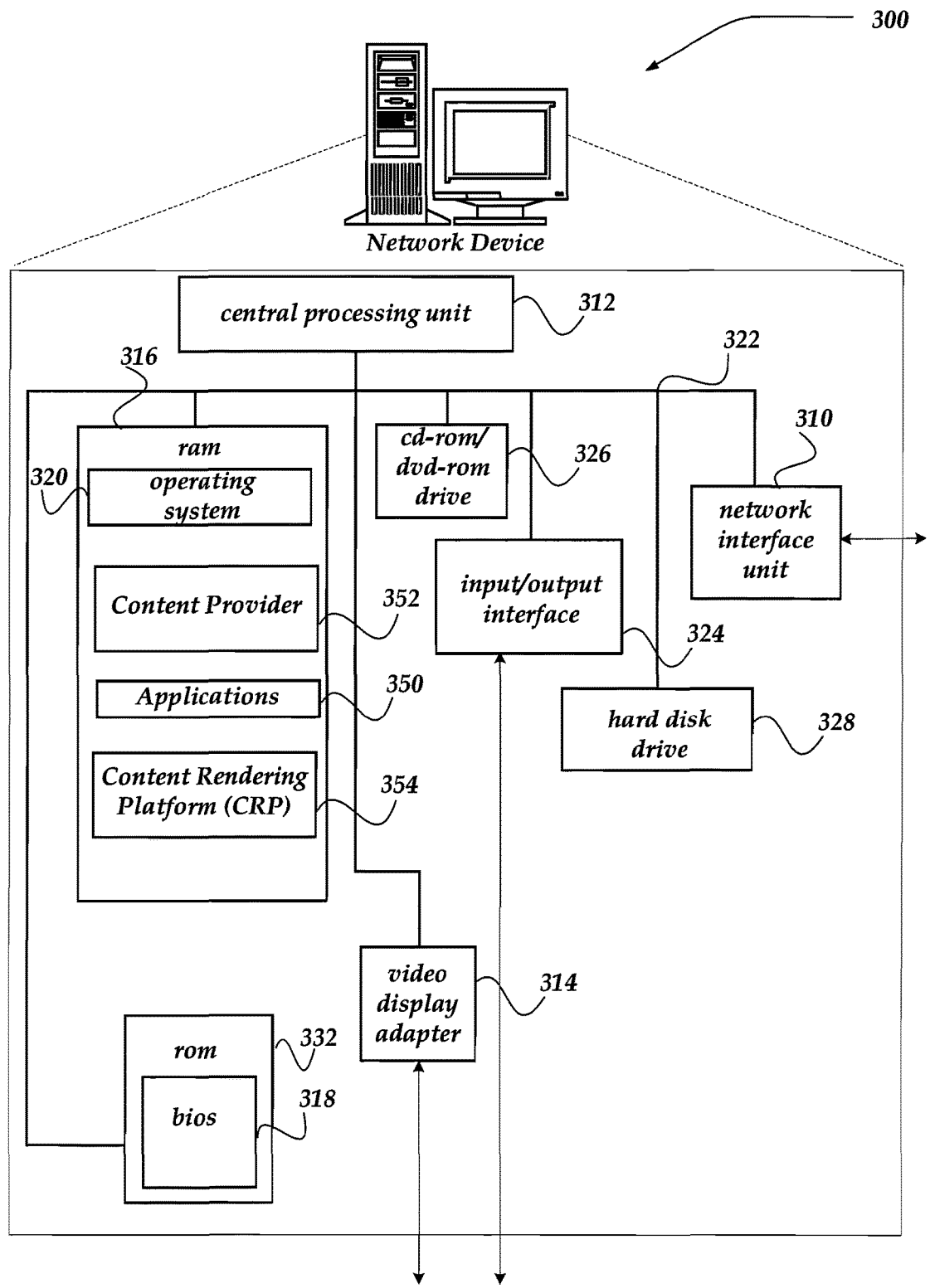
FIG. 3 illustrates one embodiment of an exemplary network device.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, CRP 106, Client device 101, and/or Content provider 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Content rendering platform (CRP) 354 may also be included as an application program within applications 350.

CRP 354 is configurable as a platform and/or a server that receives rendering context information and a markup language document from one or more resources. CRP 354 automatically renders and tailors the markup language document in a device specific language document, based at least in part on the rendering context, in a manner suited for subsequent display and/or interaction on a target remote device.

Illustrative Platforms

Figure 4:
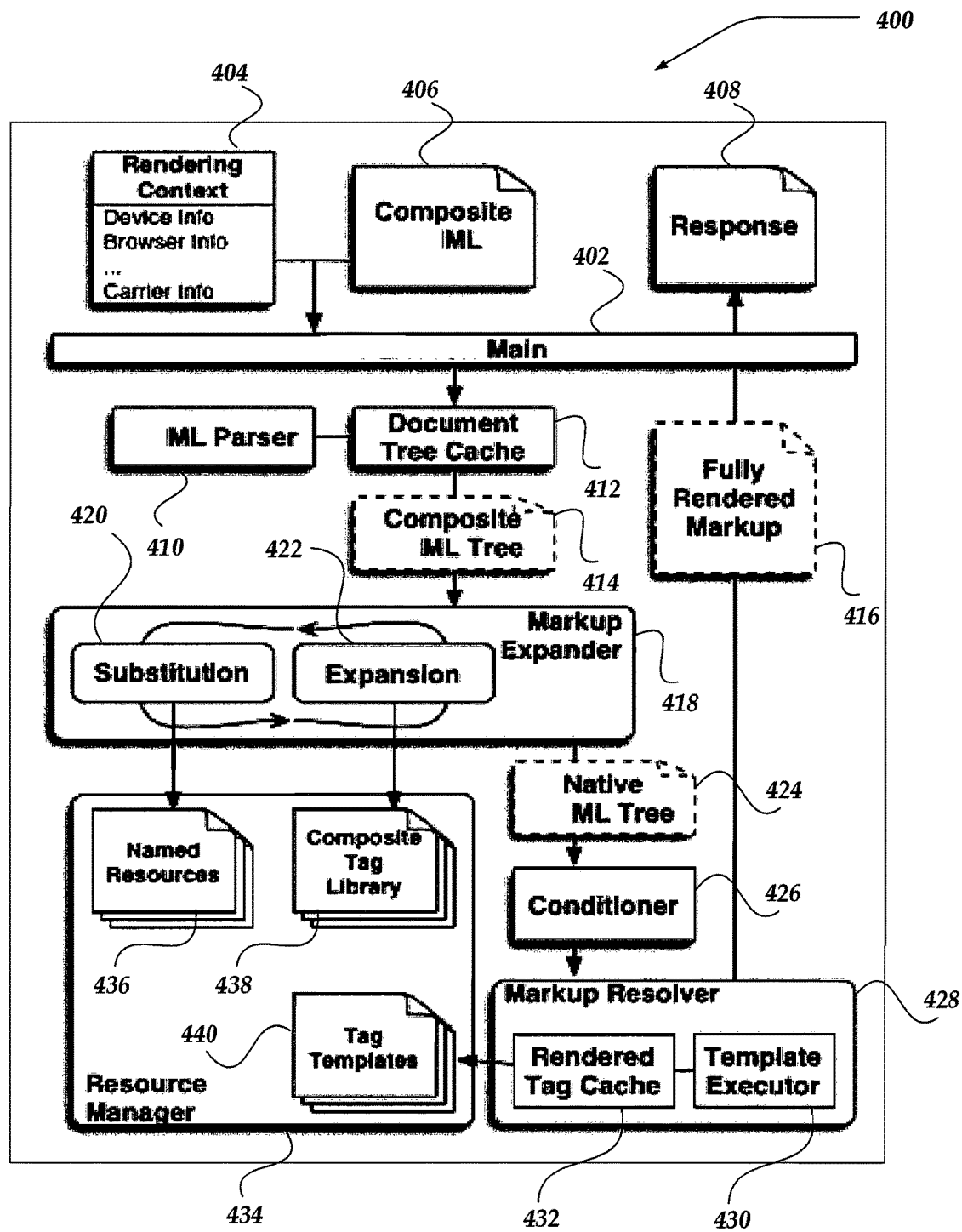
FIG. 4 shows one embodiment of an exemplary platform for rendering a markup language document for display by a target remote device.

FIG. 4 illustrates an over view of one embodiment of platform 400 for employing a composite Markup Language (ML) document and a Rendering Context to render the document into a device specific language document for subsequent display on a target remote device. Composite ML document 406 can be decomposed into more ML code. Also, Rendering Context 404 can include a unique identifier for identifying the particular combination of data and parameters for a target remote device.

From one or more other services, platforms, and/or applications, main component 402 receives both composite ML document 406 and rendering context 404. Main component 402 validates the composite ML code and checks the data, parameters and unique identifier included with rendering context 404. If an error is detected, main component 402 provides a notification of such an error, which can be provided to the target remote device and/or the provider of the composite ML document to the main component.

In at least one embodiment, the composite ML document is provided by a content provider, other platform, and/or application to platform 400. Similarly, the rendering context is separately determined either in real time and/or out of band from one or more services, platforms, applications, and/or sources, including the manufacturer of the remote device, header information in a message from the remote device, information from a gateway for a carrier that is in communication with the remote device, known bugs in software and/or hardware for the mobile device.

Cache 412 is arranged to store a document object model tree for code included in the composite ML document. Also, if a document object model tree isn't initially present in cache 412, ML parser 410 parses the document to create composite ML document object model tree 414 which is subsequently stored in the cache. In any case, the cached tree is passed to markup expander 414 which generates a document object model tree of native ML tags. Resource manager 434 employs component 436 to enable substitution for named resources and component 438 to expand composite tags from a library.

Markup expander 418 provides Native ML tree 424 to Conditioner 426 where pre-resolution processes are performed, e.g., removal of whitespace and pagination for subsequent display by the target remote device. The conditioned native ML tree is provided to Markup Resolver 428 where Component 430 executes the rendering of templates and component 432 renders tags that are included in a cache. Tag templates are provided by Component 440 which is associated with Resource Manager 434. Markup Resolver 428 provides Main component 402 with a document in a device specific language based on the initially provided composite ML document. Main component 402 subsequently provides the device specific language Document 416 for delivery to the target remote device.

The rendering can include a plurality of different processes that contribute to the full rendering of ML document into a document in a device specific language, including: (1) determining if location information regarding the target remote device can be provided in response to a request; (2) minifying cascading style sheets (CSS) by removing extraneous sheets; (3) fontifying cascading style sheets by stripping them out and rewriting as ML code; (4) shrinking the ML document to remove any ML code that is extraneous to the target remote device; (5) specifying one or more attributes of each media item to be embedded or linked in a page; (6) employing an estimate of each page size to repaginate the ML document pages to a size that is no more than the effective display screen size of the target remote device; (7) tailoring/removing ML code in a page that is estimated to be rendered as larger than the effective display screen size of the target remote device; and (8) rewriting URLs to include locations of media items and/or session identification information.

The pagination process is generally performed in conjunction with the combined operation of Markup Resolver 428 and Conditioner 426. Rendering Context 404 is queried by Conditioner 426 for the effective/maximum page size for the target remote device for each page. An general estimate of the size of each page to be rendered is determined by analyzing the nodes included in each the page. The estimate is compared to the effective page size for the target remote device to determine if there is an offset of page data that must be either repaginated to another new page or tailored/cut from an existing page. Conditioner 426 also walks the native ML tree to identify each node that is defined as breakable onto which the offset falls. The container following the breakable node is identified by Conditioner 426 with a tag as the break off point for subsequent markup resolution by Markup Resolver 428.

Further, the pagination process is completed by Markup Resolver 428 which renders nodes in a page that are tagged by Conditioner 426 for rendering and not others. However, each time a node is rendered, the size of the rendered node is noted in a running total size for that particular page. After Markup Resolver 428 renders the container that is tagged for splitting, the resolver checks to see if the split occurs either within another tag or not. If the split occurs on a tag, then the split is set to follow a previous tag or data. However, if the split doesn't occur on a tag, then a breaking method is performed to find an offset such that the split occurs over whitespace over an overly long word, e.g., 100 characters long which can be adjusted by Resource Manager 434. Additionally, after inserting the split in the page, Markup Resolver 428 can render an end of page tag that includes displayable links to the next and previous pages of the split page as necessary.

Also, although not shown, the platform can facilitate a post-rendering component to embed a media item in the device specific language document for subsequent display/playback with the target remote device. The media item can include an image, audio file, sound, graphic, video, animation, or the like. Additionally, localization of the text and any other element for the device specific language document can be performed prior to providing the document to the target remote device.

Figure 5A:
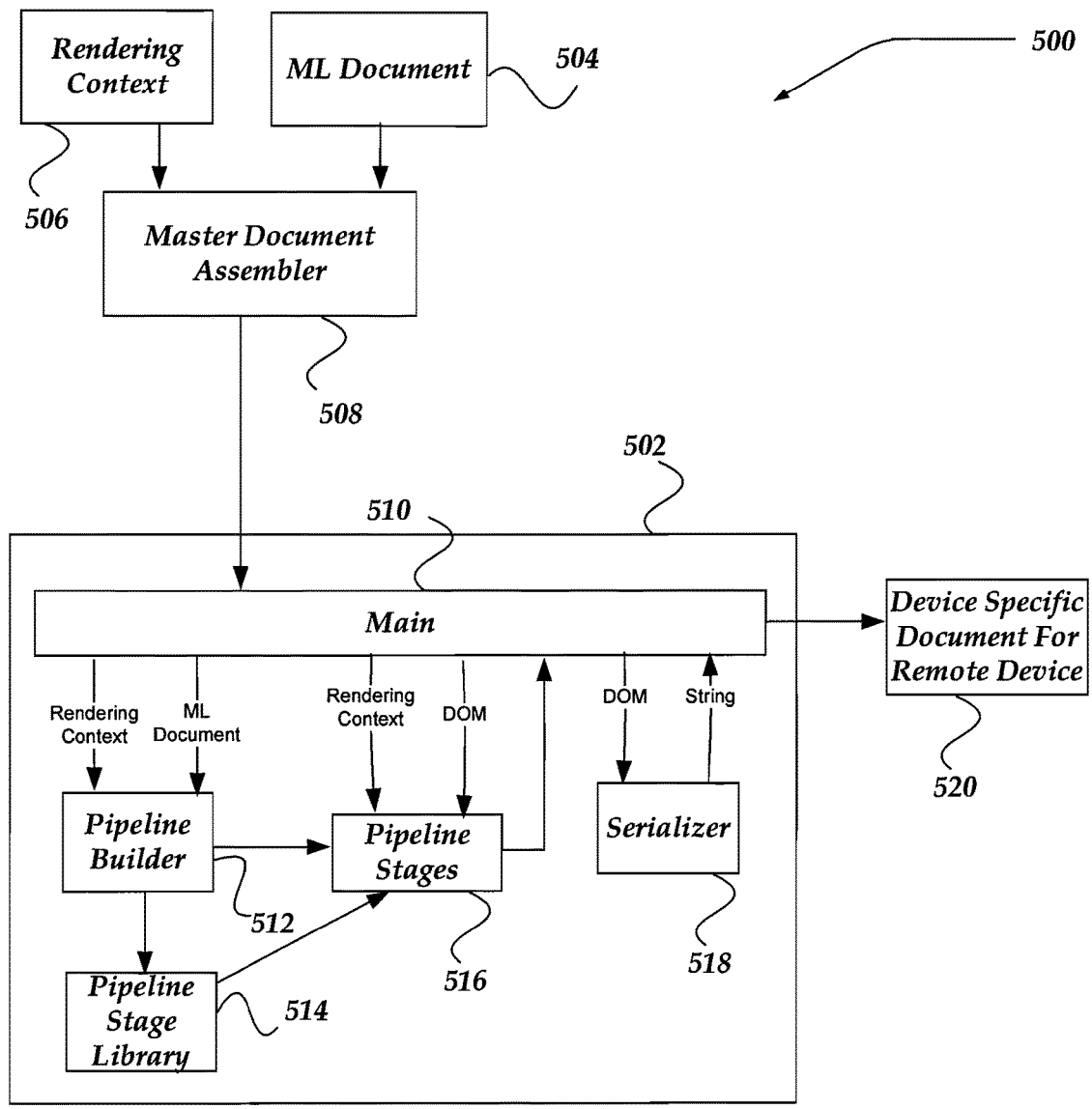
FIG. 5A illustrates another embodiment of an exemplary platform that employs pipelined stages to render a markup language document for display by a target remote device.

FIG. 5A illustrates overview 500 of one embodiment of platform 502 for pipelined rendering of Markup Language (ML) document 504 based at least in part on corresponding Rendering Context 506 for a target remote device. Rendering Context 506 and ML document 504 can be pre-processed by master document assembler 508 where informalities are handled, e.g., units can be added, blanks filled in, and/or footers added. Master Document assembler 508 provides (preprocessed) ML document 504 and rendering context 504 to platform 502 where pipeline builder component 512 parses the document to determine and identify the different stages of processing that contribute to fully rendering the ML document into a document in a device specific language, and which is based also at least in part on the rendering context for the target remote device. Pipeline builder component 512 employs pipeline stage library 514 to generate pipeline stages component 516 which is arranged to include a stage for each identified process that contributes to the full rendering of ML document 504 into a device specific language document. Further, main component 510 generates a document object model (DOM) tree that is based on ML document 504 and Rendering Context 506. Both the DOM tree and Rendering Context 506 are provided to at least a portion of the stages in pipeline stages component 516.

The stages can enable a plurality of different processes that contribute to the full rendering of ML document 504 into a device specific language document, including: (1) determining if location information regarding the target remote device can be provided in response to a request; (2) minifying cascading style sheets (CSS) by removing extraneous sheets; (3) fontifying cascading style sheets by stripping them out and rewriting as ML code; (4) shrinking the ML document to remove any ML code that is extraneous to the target remote device; (5) specifying one or more attributes of each media item to be embedded or linked in a page; (6) employing an estimate of each page size to repaginate the ML document pages to a size that is no more than the effective display screen size of the target remote device; (7) tailoring/removing ML code in a page that is estimated to be rendered as larger than the effective display screen size of the target remote device; and (8) rewriting URLs to include locations of media items and/or session identification information.

Additionally, Temp Index Add and Temp Index Remove stages (not shown) can optionally be included in pipeline stage library 514 and included as a processing stage in pipeline stage component 516. The Temp Index Add stage can be arranged to parse ML document 504 and identify each unique string in the document that doesn't already have an XML ID tag, and subsequently provide a Temp ID tag these unique strings. Also, this stage can build a Temporary Index on the fly for all of the temporary and existing XML ID tags. Other pipelined stages in component 516 can subsequently use the Temporary Index to more quickly access just those elements in the ML document that are to be rendered into a device specific language by a particular stage. Once the rendering is completed by the other pipelined stages, the Temp Index Remove stage removes the Temp XML IDs and Temporary Index. The use of Temp XML IDs and a Temporary Index can reduce the likelihood that a particular process has to parse the entire ML document to perform its portion of the full rendering into a device specific language document for the target remote device.

Serializer 518 receives the device specific language document for the target remote device and converts it into a stream of character bytes that are suitable for transmission over a communication link with the device. Additionally, a separate component can be arranged to localize the character bytes for a particular language, and another component can be arranged to embed a media item in the character stream for the target remote device.

Figure 5B:
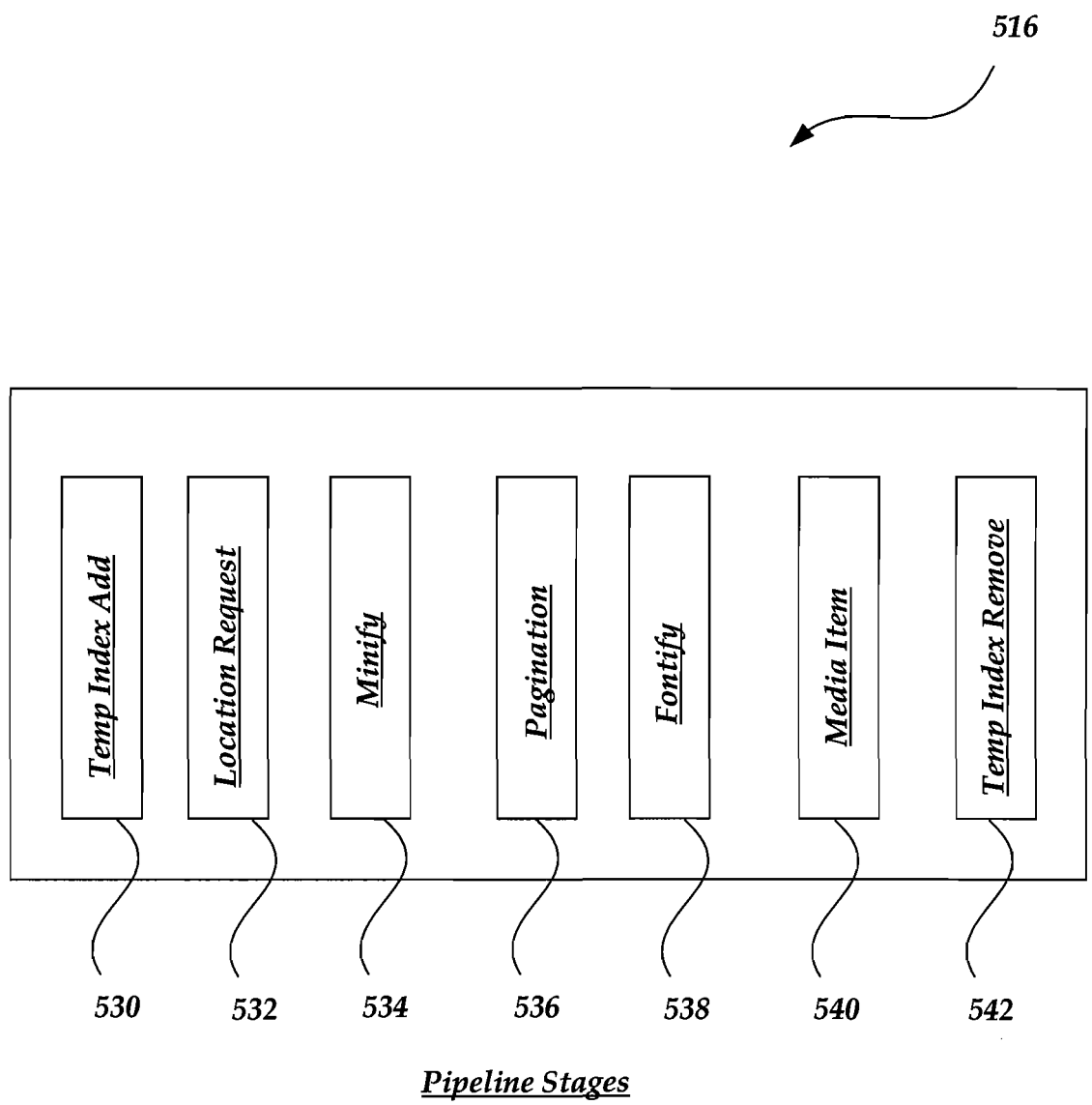
FIG. 5B shows one embodiment of exemplary pipelined stages that are employed with a platform to render a markup language document for display by a target remote device.

FIG. 5B illustrates an overview of one embodiment of a plurality of exemplary stages that can be included in pipelined stages component 516 as shown in FIG. 5A. Component 516 is shown to include as follows: Temp Index Add stage 530, Location Request stage 532, Minify stage 534, Paginate stage 536, Fontify stage 538, Media Item stage 540, and Temp Index Remove stage 542. The stages that are included in component 516 correspond to a particular target remote device and some of the same, but not all stages, plus possibly other stages might also be included in component 516 if rendering is to be performed for a different target remote device.

Illustrative Mobile Markup Language

Figure 6:
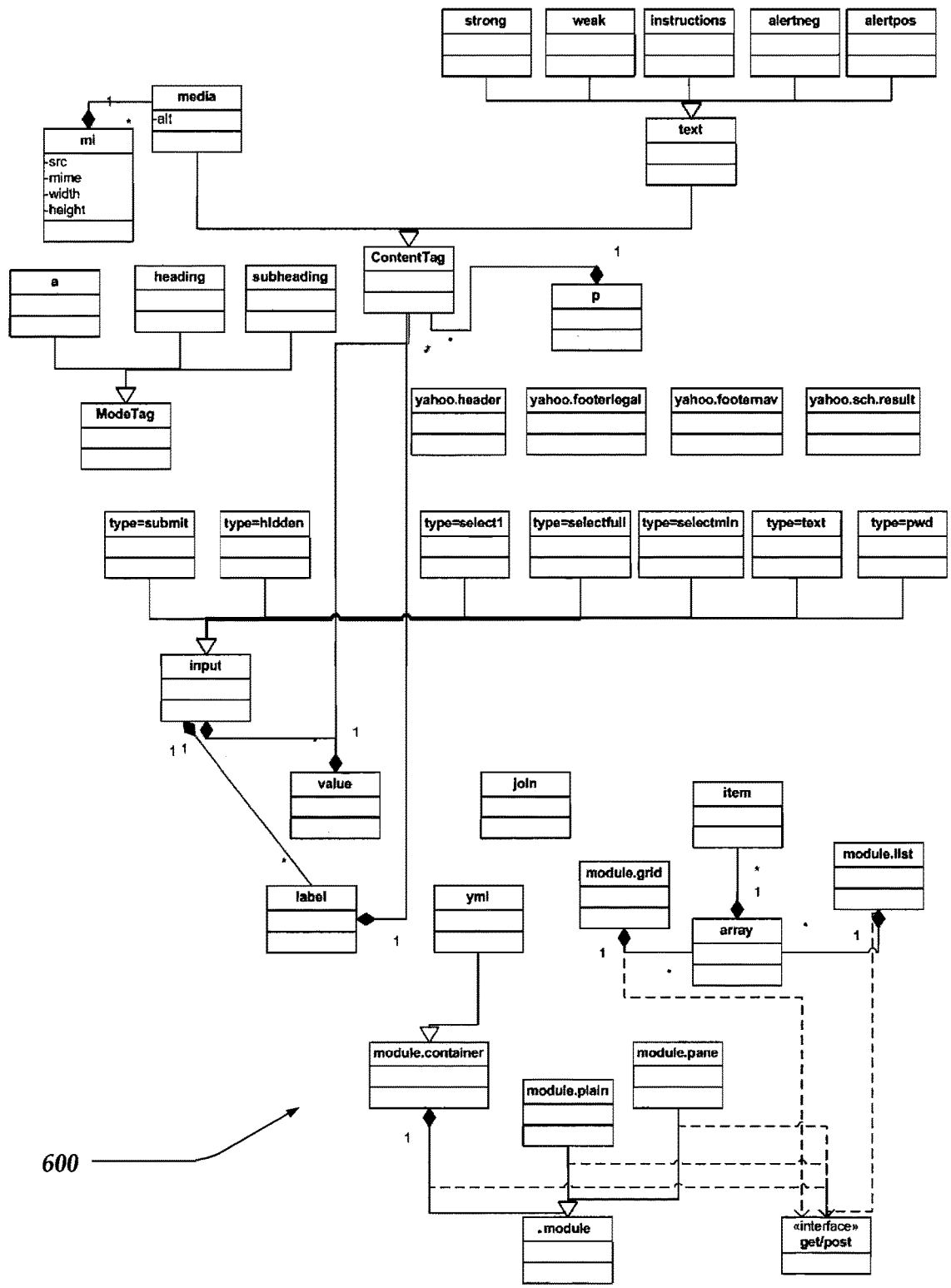
FIG. 6 illustrates yet another embodiment of an exemplary class tree for modules that enable a platform to render a markup language document for display by a target remote device.

FIG. 6 illustrates overview 600 of a class tree that can be instantiated from modules included in a document that are created in a mobile Markup Language (MML). MML is relatively independent of considerations for the target remote device and its classes can be instantiated by at least the different embodiments of a platform that are discussed above, or another resource. The main component of a platform can automatically parse the MML document to identify each MML module and subsequently instantiate a tree of classes based on the identified modules. In another embodiment, the classes are arranged to generate virtually any type of Markup Language document that can be rendered for subsequent display at the target remote device.

The rendering of the MML document into a device specific language document can include a plurality of different processes that contribute to the rendering, including: (1) determining if location information regarding the target remote device can be provided in response to a request; (2) minifying cascading style sheets (CSS) by removing extraneous sheets; (3) fontifying cascading style sheets by stripping them out and rewriting as ML code; (4) shrinking the ML document to remove any ML code that is extraneous to the target remote device; (5) specifying one or more attributes of each media item to be embedded or linked in a page; (6) employing an estimate of each page size to repaginate the ML document pages to a size that is no more than the effective display screen size of the target remote device; (7) tailoring/removing ML code in a page that is estimated to be rendered as larger than the effective display screen size of the target remote device; and (8) rewriting URLs to include locations of media items and/or session identification information.

Additionally, the MML document can include at least two categories of data structures, e.g., structure and module tags. The structure category can include content tags, form tags, mode tags, and organization tags, and the like. Also, the module category can include generic module tags, global module tags, and property module tags. Additionally, some of the module tags can be arranged for tailoring the rendering of the MML document.

A listing of at least a portion the MML tags are listed below.

Structure Tags
   Content Tags—<text>
   Type Tags—<media>; <mi> (media item)
   Form Tags—<input>, <submit>, <hidden>, <label>, <value>
   Mode Tags—<a>, <heading>, <subheading>,
   Organization Tags—<p>, <item>, <array>, <join>, <yml>

Module Tags
   Generic Modules—<module.container>, <module.grid>, <module.pane>, <module.list>, <module.plain>
   styling (Attribute)
   Global Modules—<yahoo.header>, <yahoo.footernav>, <yahoo.footerlegal>
   Property Module—<yahoo.sch.result>

Although the names of the tags in the two categories tend to be descriptive of their functionality (which somewhat parallels similar sounding tags in other markup languages), the MML tags are primarily used to capture the intent of the programmer, not the styling necessary to actually render pages for display on a target remote device. For example, the generic module tag <module.list> is handled as a request by the platform to render a list for display on a target mobile device. However, since the <module.list> tag doesn't specify substantive details necessary to actually perform the rendering, the platform handles these details by using data and parameters included in the Rendering Context, e.g., portrait or landscape orientation of the list, width and height of the effective display screen, and the pagination size for displaying pages. The rendering of the intent of the MML tags is handled by at least one of the platforms discussed above, or other resources in a manner substantially similar to other tags provided in other types of markup language documents.

Generalized Operation of Platforms

The methods and processes for certain aspects of the invention will now be described with respect to FIGS. 7-11B.

Figure 7:
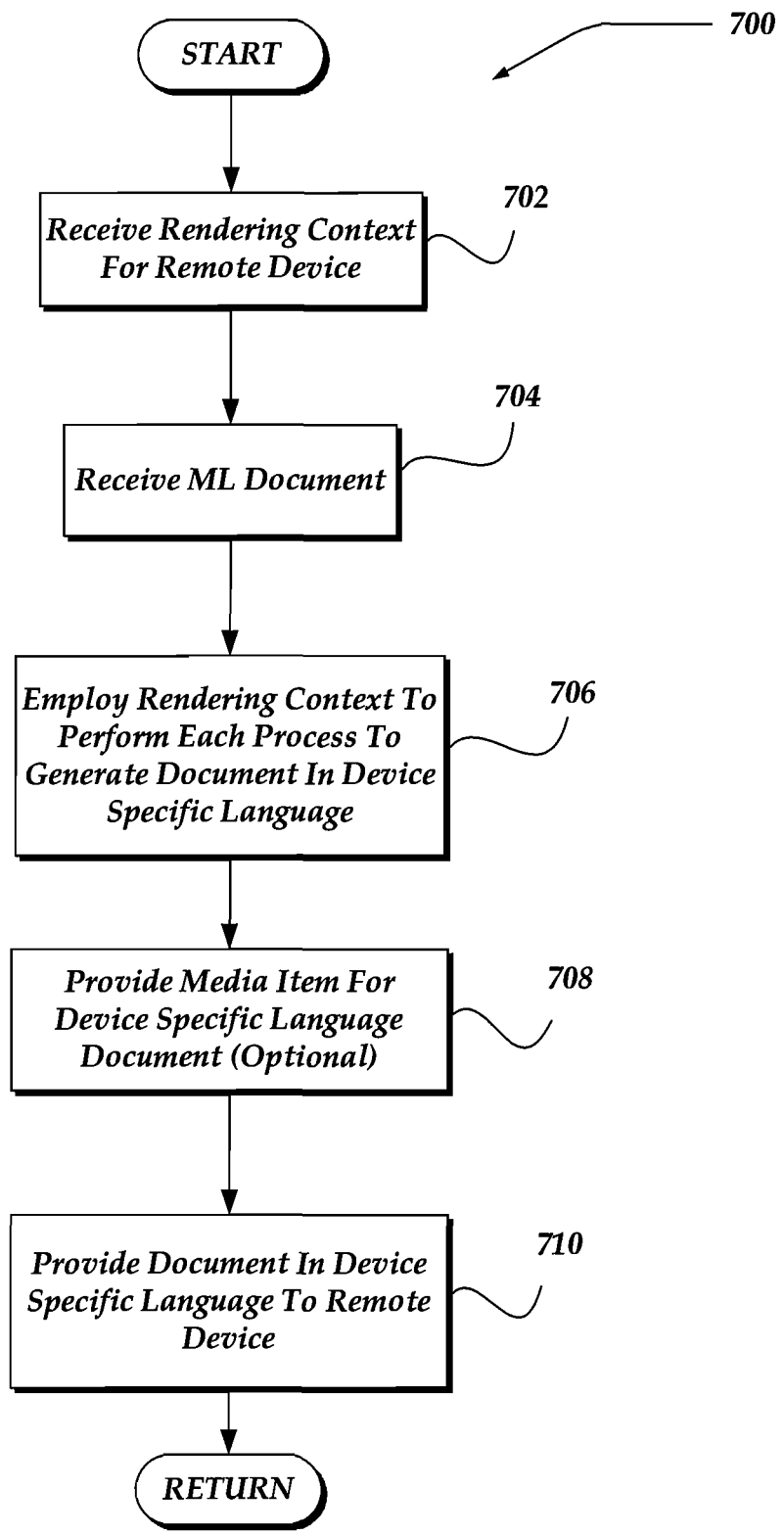
FIG. 7 shows an overview of a process for generally employing a platform to render a markup language document for display by a target remote device.

FIG. 7 illustrates overview 700 of a process generally employed by any embodiments of the inventive platforms to render a Markup Language (ML) document for display by a target remote device. Moving from a start block the process steps to block 702 where a Rendering Context for a particular target remote device is received. At block 704, a Markup Language document is also received. The ML document and the Rendering Context are generated and subsequently provided by one or more of the same or different resources, including, but not limited to, content providers, carriers, web services, affiliates, users, and websites.

Flowing to block 706, the data and parameters included in the Rendering Context for the target remote device are employed by one or more processes to fully render the ML document into a document in a device specific language for the remote device. Moving to block 708, the process can optionally provide a media item that can be either referenced by a link or embedded in the device specific language document. At block 710, the device specific language document is provided to the target remote device for subsequent display. In one embodiment, the carrier provides the device specific language document as a character string over a communication link to the target remote device. Next, the process returns to performing other actions.

Figure 8:
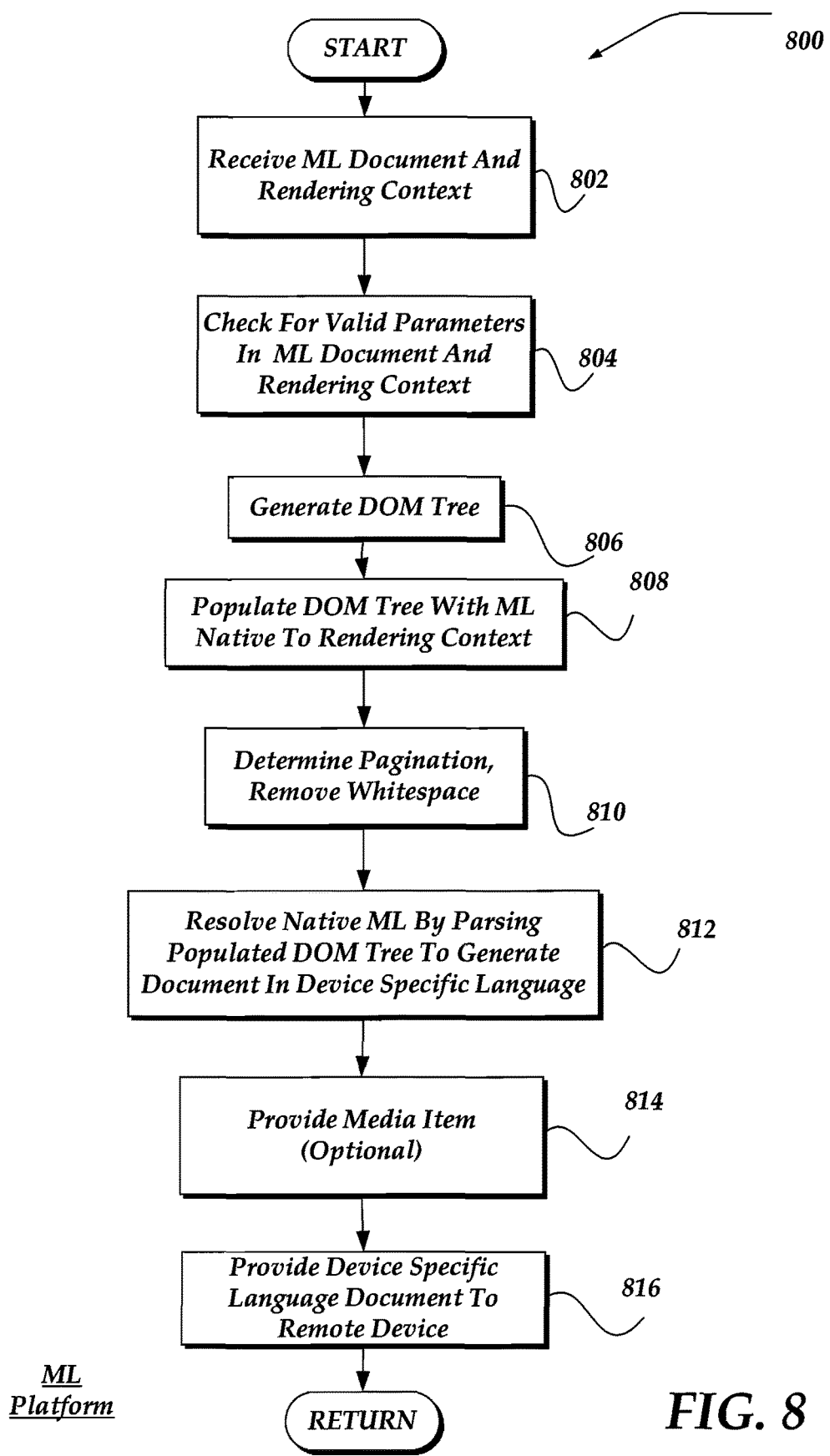
FIG. 8 illustrates an overview of a process for employing a platform for rendering a markup language document for display by a target remote device.

FIG. 8 illustrates overview 800 of the process that can be performed by at least the platform illustrated in FIG. 4. Moving from a start block, the process steps to block 802 where a Markup Language (ML) document and Rendering Context for a target remote device are received from another resource. Moving to block 804, the process checks the validity of the data and parameters included in the ML document and the Rendering Context. At block 806, a document object model tree is generated. At block 808, the Rendering Context enables the DOM tree to be populated with ML code that is native to the target remote device.

Stepping to block 810, the process determines pagination for the rendered pages of the ML document. The process paginates these pages so that they are no greater in size than the effective size of the display screen for the target remote device. In some cases, next and previous links are created for newly paginated pages. The process can also remove relatively unnecessary whitespace in the ML document. At block 812, the process parses the populated DOM tree and resolves the native ML code into a document in a device specific language. Advancing to block 814, one or more media items can optionally be either referenced by a link or embedded in the device specific language document. At block 816, the device specific language document is provided to the target remote device for subsequent display. In one embodiment, the carrier provides the device specific language document as a character string over a communication link to the target remote device. Next, the process returns to performing other actions.

Figure 9:
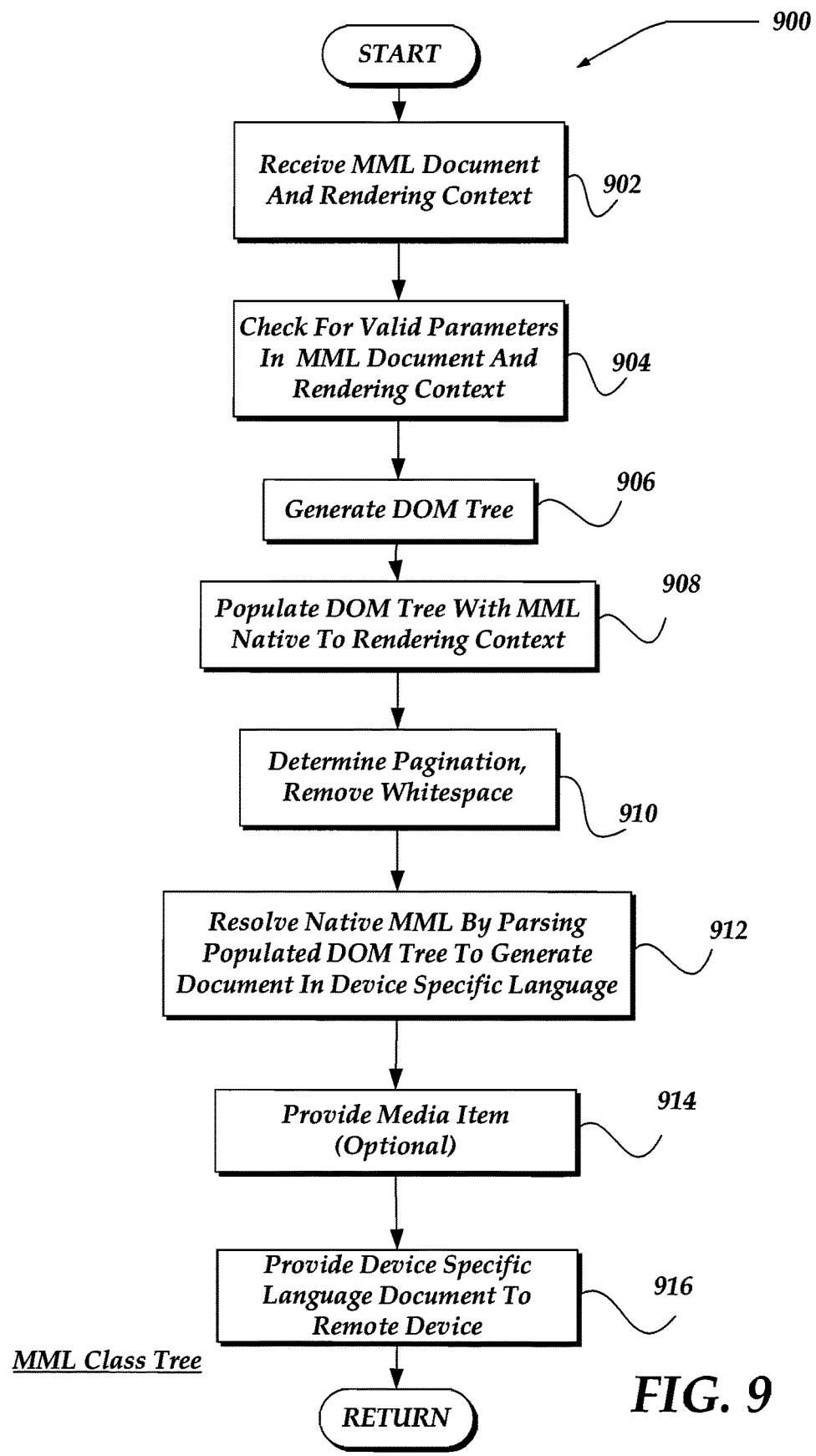
FIG. 9 shows an overview of a process for employing class tree for modules that enable rendering of a markup language document for display by a target remote device.

FIG. 9 illustrates overview 900 of a process for employing at least one of the disclosed embodiments of a platform to fully render a document written in a mobile Markup Language (MML) that is arranged to provide a programmers intent, and not the particular details associated with the actual rendering of this document into a device specific language document for subsequent display by a target remote device.

Moving from a start block, the process steps to block 902 where a mobile Markup Language (MML) document and Rendering Context for a target remote device are received from another resource. Moving to block 904, the process checks the validity of the data and parameters included in the ML document and the Rendering Context. At block 906, a document object model tree is generated. At block 908, the Rendering Context enables the DOM tree to be populated with ML code that is native to the target remote device.

Stepping to block 910, the process determines pagination for the rendered pages of the ML document. The process paginates these pages so that they are no greater in size than the effective size of the display screen for the target remote device. In some cases, next and previous links are created for newly paginated pages. The process can also remove relatively unnecessary whitespace in the ML document. At block 912, the process parses the populated DOM tree to resolve the native ML code into a document in a device specific language. Advancing to block 914, one or more media items can optionally be either referenced by a link or embedded in the fully rendered ML document. At block 816, the device specific language document is provided to the target remote device for subsequent display. In one embodiment, the carrier provides the device specific language document as a character string over a communication link to the target remote device. Next, the process returns to performing other actions.

Figure 10:
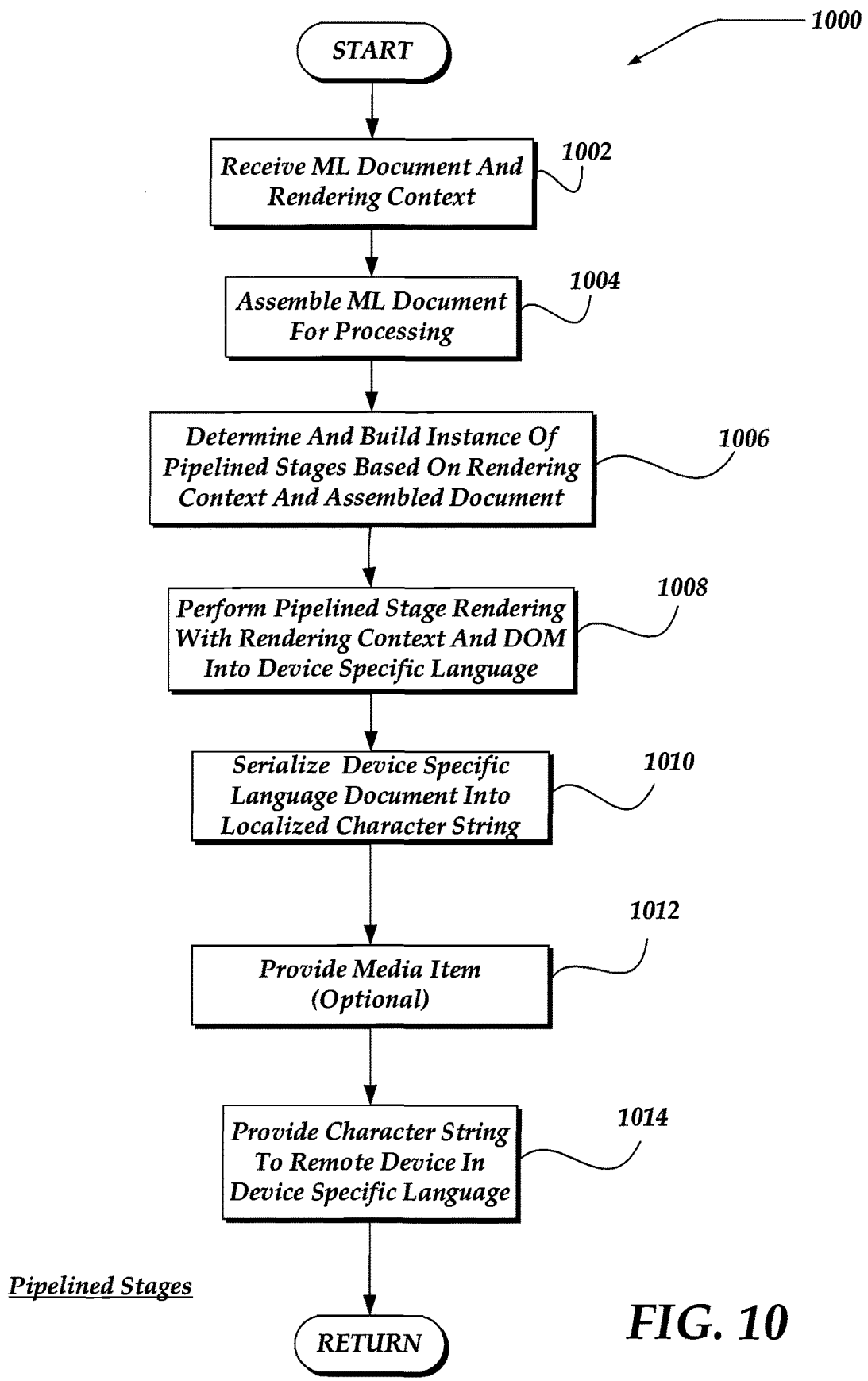
FIG. 10 illustrates a process for pipelined stages that render a markup language document for display by a target remote device.

FIG. 10 illustrates overview 1000 of a process for employing a platform to fully render a Markup Language (ML) document with a platform that provides pipelined stages for rendering different portions of the ML document. Moving from a start block, the process flows to block 1002 where the ML document and a Rendering Context for the target mobile device are received from one or more of the same, or different, resources. At block 1004, the ML document is assembled for processing. For example, common headers and footers, units, and other incidental elements can be added to the ML document. Next, at block 1006, the process parses the ML document and reviews the data and parameters of the Rendering Context to build an instance of pipelined stages that can enable the full rendering of the elements included in the ML document. The process also converts the assembled ML document into a document object model (DOM) document.

At block 1008, the process performs pipelined stage rendering and pagination of the elements included in the DOM document into a device specific language document based at least in part on the Rendering Context for the target remote device. Flowing to block 1010, the process serializes the rendered DOM document (now a device specific language document) into a character string, which can optionally be localized to a particular spoken language for the target remote device.

Moving to block 1012, the process can optionally provide a media item that can be either referenced by a link or embedded in the fully rendered character string. At block 1014, the character string plus any included media items are made available for subsequent display by the target remote device. In one embodiment, the carrier provides the device specific language document as a character string over a communication link to the target remote device. Next, the process returns to performing other actions.

Illustrative Temp Indexing

Figure 11A:
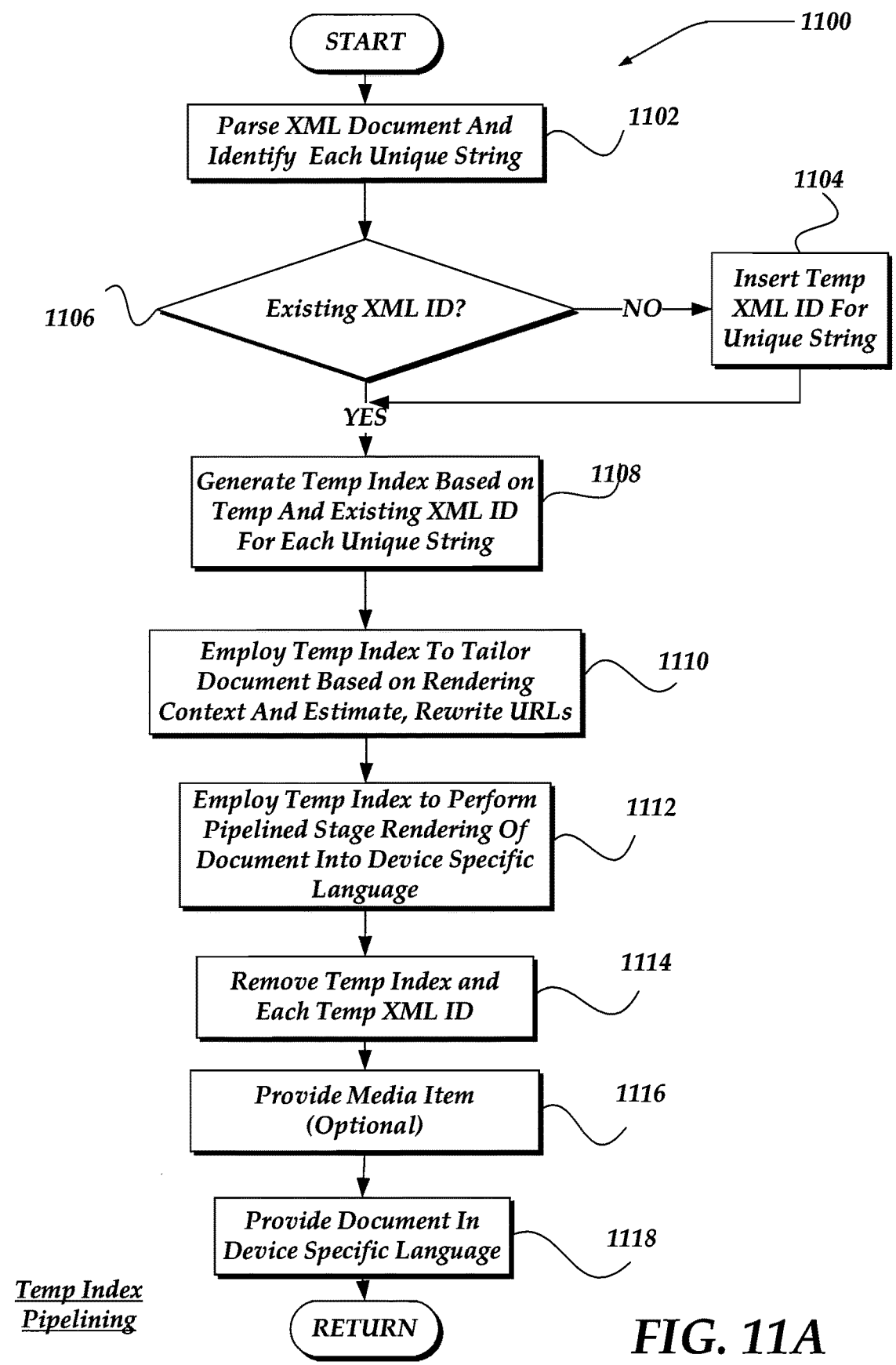
FIG. 11A shows a process for employing Temporary IDs and Indexes to pipeline process the rendering of a markup language document for display by a target remote device.

FIG. 11A illustrates process 1100 for a platform that temporarily creates and indexes temporary XML IDs for unique strings in a received XML document on the fly to speed up the pipeline stage rendering of the document's pages for subsequent display by a target remote device. Also, in at least one other embodiment, the temporary on the fly index and XML IDs can be employed to speed up the rendering of an XML document for further processing by a local device or distributed computing device.

Moving from a start block, the process flows to block 1102 where a received Markup Language (XML) document is parsed to identify each unique string. A Rendering Context for a target remote device is also received. At decision block 1106, if an XML ID exists for a unique string, then the process moves to block 1108. However, if the identified unique string doesn't correspond to an existing XML ID, then a temporary XML ID is added to the unique string at block 1104. In any case, after each identified unique string corresponds to either an existing or temporary XML ID, the process flows to block 1108 where a temporary index is generated for the XML document that lists the location of each unique string in the XML document based at least in part on the existing or temporary XML ID.

At block 1110, the temporary index and the Rendering Context are employed to estimate the page size of the XML document for display on the target remote device, and subsequently tailor and/or repaginate pages with oversized estimates. Also, session IDs can be added and URLs rewritten as necessary. Advancing to block 1112, the process employs the temporary index and Rendering Context to perform pipelined stage rendering on each unique string until the entire XML document is fully rendered into a document in a device specific language.

At block 1114, the temporary index and the temporary XML IDs are removed from the device specific language document. Moving to block 1116, the process can optionally provide a media item that can be either referenced by a link or embedded in the device specific language document. At block 1118, the device specific language document plus any included media items are made available for subsequent display by the target remote device. In one embodiment, the carrier provides the device specific language document as a character string over a communication link to the target remote device. Next, the process returns to performing other actions.

Figure 11B:
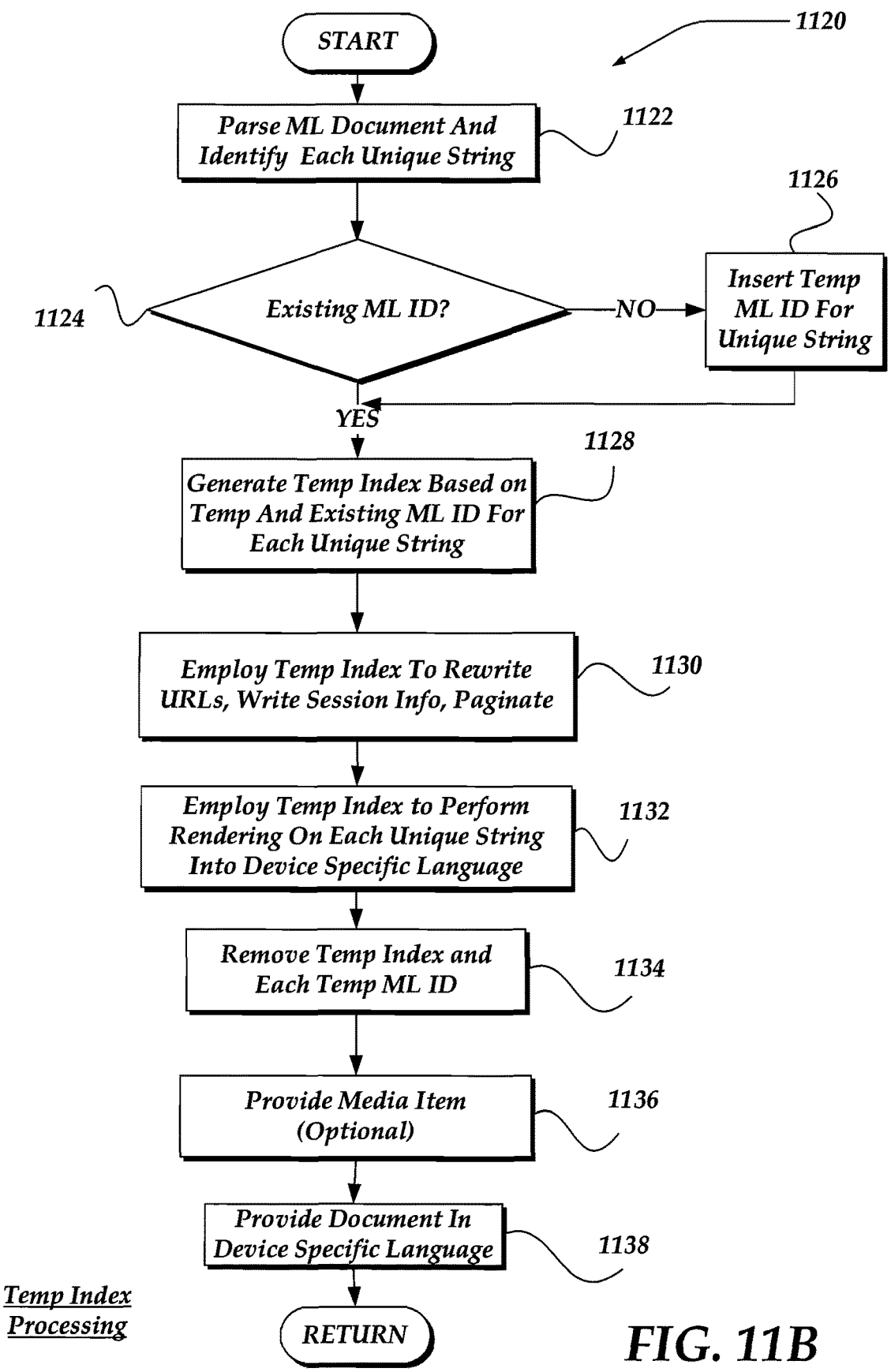
FIG. 11B illustrates a process for employing Temporary IDs and Temporary Indexes to render a markup language document for display by a target remote device, in accordance with the invention.

FIG. 11B illustrates process 1120 for a platform that temporarily creates and indexes temporary IDs for unique strings on the fly in a received Markup Language (ML) document to speed up the rendering of the document's pages into a device specific language document for subsequent display by a target remote device. However, in at least one other embodiment, the temporary on the fly index and ML IDs can be employed to speed up the rendering of an ML document for further processing by a local device or distributed computing device.

Moving from a start block, the process flows to block 1122 where a received Markup Language (ML) document is parsed to identify each unique string. A Rendering Context for a target remote device is also received. At decision block 1124, if an XML ID exists for a unique string, then the process moves to block 1128. However, if the identified unique string doesn't correspond to an existing ML ID, then a temporary ML ID is added to the unique string at block 1126. In any case, after each identified unique string corresponds to either an existing or temporary ML ID, the process flows to block 1128 where a temporary index is generated for the ML document that lists the location of each unique string in the ML document based at least in part on the existing or temporary ML ID.

At block 1130, the temporary index and the Rendering Context are employed to estimate the page size of the XML document for display on the target remote device, and subsequently tailor and/or repaginate pages with oversized estimates. Also, session IDs can be added and URLs rewritten as needed. Advancing to block 1132, the process employs the temporary index and Rendering Context to perform rendering of each unique string until the entire ML document is fully rendered into a document in a device specific language.

At block 1134, the temporary index and the temporary ML IDs are removed from the device specific language document. Moving to block 1136, the process can optionally provide a media item that can be either referenced by a link or embedded in the device specific language document. At block 1138, the device specific language document plus any included media items are provide to the target remote device for subsequent display. In one embodiment, the carrier provides the device specific language document as a character string over a communication link to the target remote device. Next, the process returns to performing other actions.

It will be understood that each block of the above flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions executing on the processor provide steps for implementing the actions listed in the flowcharts discussed above.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed as new and desired to be protected by Letters Patent of the United States is:

1. A method for rendering a markup language (ML) document for display by a remote device, comprising:
receiving, by a processor, the ML document;
receiving, by the processor, a rendering context associated with the remote device, the rendering context comprising a data structure that defines parameters used to render content on a display of the remote device;
parsing, by the processor, the ML document to identify a set of ML elements included in the ML document;
associating, by the processor, each of the ML elements with an ML identifier (ID), the associating comprising:
identifying, by the processor, a first set of ML elements that are associated with eXtensible Markup Language (XML) IDs and using the XML IDs as the ML IDs,
creating, by the processor, temporary ML IDs for each ML element that is not associated with an existing ML ID, and
using, by the processor, the temporary IDs as the ML IDs by inserting the temporary ML IDs into each corresponding ML element;
generating, by the processor, a temporary index for the ML document based on the ML IDs, the temporary index identifying a location of a given ML element within the ML document based on the ML IDs;
rendering, by the processor, the ML document into a document in a device specific language, the rendering comprising locating a portion of the ML document within the ML document using the temporary index, the locating comprising a random access locating;
removing, by the processor, the temporary index and each temporary ML ID from the device specific language document before it is provided to the remote device; and
enabling, by the processor, the device specific language document to be provided to the remote device.

2. The method of claim 1, further comprising:
performing an embedding step selected from a group of embedding steps consisting of embedding a media item in the device specific language document; and
including a link to the media item in the device specific language document.

3. The method of claim 1, further comprising:
determining each of a plurality of processes to be performed to fully render the ML document;
building a pipeline of each determined process that in total enable a fill rendering of the ML document; and
arranging the ML document into a tree, wherein the rendering context and the pipeline of processes are employed to resolve the tree into a full rendering of the ML document into the device specific language document.

4. The method of claim 1, further comprising assembling the received ML document, wherein the assembling includes performing an assembling step selected from a group of assembling steps consisting of adding a unit to a module, filling in a blank, adding a header, and adding a footer.

5. The method of claim 1, wherein enabling the device specific language document to be provided to the remote device, further comprises serializing the device specific language document into a character string.

6. The method of claim 1, wherein the Markup Language is a mobile Markup Language that provides for an intent of an author for displaying content in the ML document on the remote device, and wherein the actual arrangement of content rendered for display by the remote device is based at least in part on the rendering context.

7. The method of claim 1, wherein the rendering of the ML document includes a rendering step selected from a group of rendering steps consisting of:
determining if location information regarding the remote device can be provided in response to a request;
minifying cascading style sheets (CSS) by removing extraneous sheets;
fontifying cascading style sheets by stripping them out and rewriting as ML code;
shrinking the ML document to remove any ML code that is extraneous to the remote device;
specifying one or more attributes of each media item to be included with the rendered ML document;
employing an estimate of each page size to repaginate the ML document's pages to a size that is no more than an effective size for the remote device;
tailoring ML code in a page of the ML document that is estimated to be rendered as larger than the effective size for the remote device;
rewriting a URL to include a location of a media item; and
rewriting a URL to include session identification information.

8. The method of claim 1, wherein the remote device provides for at least one of wired or wireless communication over a network.

9. A system for rendering a Markup Language (ML) document for display on a remote device, the ML document comprising a first link to a first media object in a first format, the system comprising:
a platform comprising a processor that is arranged to execute computer instructions, the computer instructions comprising:
receiving the ML document and a rendering context from another resource, the rendering context comprising a data structure that defines parameters used to render content on a display of the remote device;
parsing, by the processor, the ML document to identify a set of ML elements included in the ML document;
associating, by the processor, each of the ML elements with an ML identifier (ID), the associating comprising:
identifying, by the processor, a first set of ML elements that are associated with eXtensible Markup Language (XML) IDs and using the XML IDs as the ML IDs,
creating temporary ML IDs for each ML element that is not associated with an existing ML ID;
using the temporary IDs as the ML IDs by inserting the ML IDs into each corresponding ML element;
generating a temporary index for the ML document based on the ML IDs, the temporary index identifying a location of a given ML element within the ML document based on the ML IDs;
rendering the ML document into a document in a device specific language, the rendering comprising locating a portion of the ML document within the ML document using the temporary index, the locating comprising a random access locating;
removing the temporary index and each temporary ML ID from the device specific language document before it is provided to the remote device; and
providing the device specific language document over a network for display by the remote device.

10. The system of claim 9, wherein the platform performs an action selected from a group of actions consisting of:

embedding a media item in the device specific language document; and including a link to the media item in the device specific language document.

11. The system of claim 9, wherein the platform performs at least one of further actions, comprising:

determining each of a plurality of processes to be performed to fully render the ML document into the device specific language document;

building a pipeline of each determined process that in total enable a full rendering of the ML document into the device specific language document; and arranging the ML document into a tree, wherein the rendering context and the pipeline of processes are employed to resolve the tree into the device specific language document.

12. The system of claim 9, wherein the platform performs further actions, comprising assembling the received ML document, wherein the assembling includes performing an assembling step selected from a group of assembling steps consisting of adding a unit to a module, filling in a blank, adding a header, and adding a footer.

13. The system of claim 9, wherein enabling the device specific language document to be provided to the remote device, further comprises serializing the device specific language document into a character string.

14. The system of claim 9, wherein the Markup Language is a mobile Markup Language that provides for an intent of an author for displaying content in the ML document on the remote device, and wherein an actual arrangement of content for display by the remote device is based at least in part on the rendering context.

15. The system of claim 9, wherein the rendering of the ML document includes performing a rendering step selected from a group of rendering steps consisting of:

determining if location information regarding the remote device can be provided in response to a request;

minifying cascading style sheets (CSS) by removing extraneous sheets;

fontifying cascading style sheets by stripping them out and rewriting as ML code;

shrinking the ML document to remove any ML code that is extraneous to the remote device;

specifying one or more attributes of each media item to be included with the rendered ML document;

employing an estimate of each page size to repaginate the ML document's pages to a size that is no more than an effective size for the remote device;

tailoring ML code in a page of the ML document that is estimated to be rendered as larger than the effective size for the remote device;

rewriting a URL to include a location of a media item; and rewriting a URL to include session identification information.

16. The system of claim 9, wherein the remote device provides for at least one of wired or wireless communication over the network.

17. A non-transitory computer readable storage medium for tangibly storing computer program instructions capable of being executed by a computer processor, the computer program instructions defining the steps of:

receiving, by the computer processor, a markup language (ML) document to be displayed by a remote device;

receiving, by the computer processor, a rendering context associated with the remote device, the rendering context comprising a data structure that defines parameters used to render content on a display of the remote device;

parsing, by the computer processor, the ML document to identify a set of ML elements included in the ML document;

associating, by the computer processor, each of the ML elements with an ML identifier (ID), the associating comprising:

identifying, by the computer processor, a first set of ML elements that are associated with eXtensible Markup Language (XML) IDs and using the XML IDs as the ML IDs, creating, by the computer processor, temporary ML IDs for each ML element that is not associated with an existing ML ID, and using, by the computer processor, the temporary IDs as the ML IDs by inserting the temporary ML IDs into each corresponding ML element;

generating, by the computer processor, a temporary index for the ML document based on the ML IDs, the temporary index identifying a location of a given ML element within the ML document based on the ML IDs;

rendering, by the computer processor, the ML document into the device specific language document, the rendering comprising locating a portion of the ML document within the ML document using the temporary index, the locating comprising a random access locating;

removing, by the computer processor, the temporary index and each temporary ML ID from the device specific language document before it is provided to the remote device; and enabling, by the computer processor, the device specific language document to be provided to the remote device.

18. A server that enables rendering of a markup language (ML) document for display by a remote device, comprising:

a memory for storing data; and a processor for enabling actions, comprising:

receiving the ML document;

receiving a rendering context associated with the remote device, the rendering context comprising a data structure that defines parameters used to render content on a display of the remote device;

parsing the ML document to identify a set of ML elements included in the ML document;

associating each of the ML elements with an ML identifier (ID), the associating comprising:

identifying a first set of ML elements that are associated with eXtensible Markup Language (XML) IDs and using the XML IDs as the ML IDs, creating temporary ML IDs for each ML element that is not associated with an existing ML ID, and using the temporary IDs as the ML IDs by inserting the temporary ML IDs into each corresponding ML element;

generating a temporary index for the ML document based on each the ML IDs, the temporary index identifying a location of a given ML element within the ML document based on the ML IDs;

rendering the ML document into the device specific language document, the rendering comprising locating a portion of the ML document within the ML document using the temporary index, the locating comprising a random access locating;

removing the temporary index and each temporary ML ID from the device specific language document before it is provided to the remote device; and enabling the device specific language document to be provided to the remote device.

19. A network device, comprising:

a memory for storing data; and a processor for enabling actions, including:

receiving a markup language (ML) document for display by a remote device;

receiving a rendering context associated with the remote device, the rendering context comprising a data structure that defines parameters used to render content on a display of the remote device;

parsing, by the processor, the ML document to identify a set of ML elements included in the ML document;

associating, by the processor, each of the ML elements with an ML identifier (ID), the associating comprising:

identifying, by the processor, a first set of ML elements that are associated with eXtensible Markup Language (XML) IDs and using the XML IDs as the ML IDs, creating temporary ML IDs for each ML element that is not associated with an existing ML ID, and using the temporary IDs as the ML IDs by inserting the temporary ML IDs into each corresponding ML element;

generating a temporary index for the ML document based on each the ML IDs, the temporary index identifying a location of a given ML element within the ML document based on the ML IDs;

rendering the ML document into a document in a device specific language, the rendering comprising locating a portion of the ML document within the ML document using the temporary index, the locating comprising a random access locating removing the temporary index and each temporary ML ID from the device specific language document prior to providing the device specific language document to the remote device.

\* \* \* \* \*